Nov. 27, 1934.    B. B. SMITH    1,982,124

COMBINATION BAIL AND LID OPENER FOR CONTAINERS

Filed Nov. 19, 1932

Inventor
Beauford B. Smith
By Thomas Bilyeu
Attorney

Patented Nov. 27, 1934

1,982,124

UNITED STATES PATENT OFFICE 1,982,124

COMBINATION BAIL AND LID OPENER FOR CONTAINERS

Beauford B. Smith, Silverton, Oreg.

Application November 19, 1932, Serial No. 643,450

2 Claims. (Cl. 220—95)

My device is primarily adapted for being normally maintained closed relative to the container by frictional engagement therewith.

My device is primarily comprised of a bail having journals disposed adjacent each end of the bail. Ears are adapted adjacent the journal portion of the bail for hermetically sealing the holes disposed in the side walls of the container through which the ends of the bail pass. A cam is associated with one end of the bail that is adapted for engaging the under side of the lid when closed and for unseating the lid and unsealing the same relative to that of the container. Means is associated with the bail for normally maintaining the camming portion of the bail in inoperative position.

One of the objects of my invention is to provide a container having a sealing lid that is normally maintained sealed through frictional engagement that will have associated with the bail means for unseating the lid when the bail is manipulated in one direction, and having means associated with the container and with the bail for maintaining the bail normally in a lowered position and the cam in an inoperative position.

And a still further object of my invention consists in providing a container with a bail that is adapted for being manually manipulated for unseating the lid relative to the container.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing.

Like reference characters refer to like parts throughout the several views.

Figure 1:
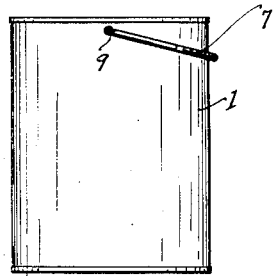
Fig. 1 is a side view of the container, having one of my new and improved bails associated therewith.
Figure 3:
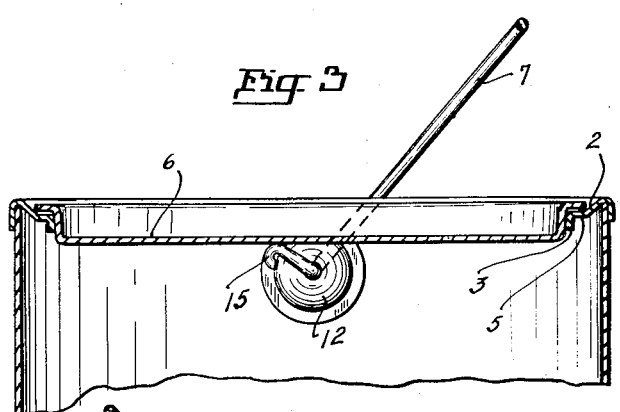
Fig. 3 is a sectional, side view, of the top portion of the container and illustrating the bail in position so that the cam terminal disposed at one end of the bail may be used for unsealing the lid, of the container that is secured thereto by frictional engagement. This view is taken on line 3—3 of Fig. 2, looking in the direction indicated.
Figure 2:
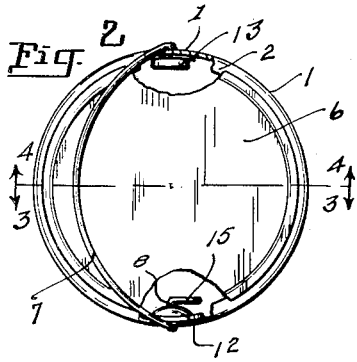
Fig. 2 is a top, plan view of the container illustrated in Fig. 1, and having a portion of the sealing lid and a portion of the top cover of the container broken away to illustrate the adaptation of the bail to the container.
Figure 4:
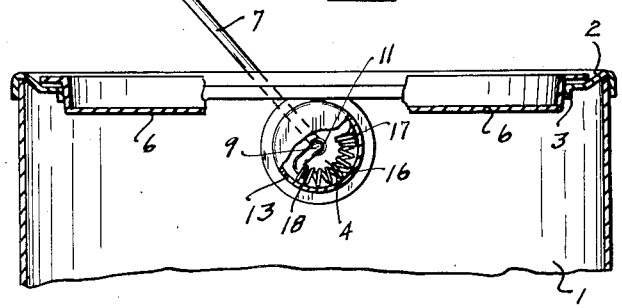
Fig. 4 is a sectional, side view, of the top of the container and of the lid and illustrates a reacting element associated with one end of the bail for normally maintaining the bail lowered and for maintaining the cam surface of the bail in inoperative position. This view is taken on line 4—4 of Fig. 2, looking in the direction indicated.
Figure 6:
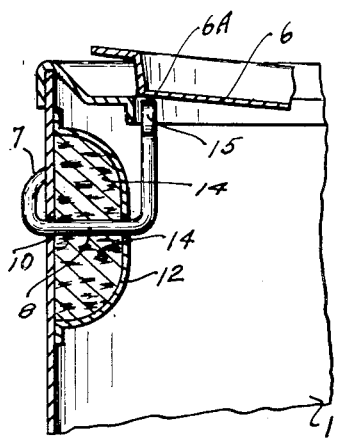
Fig. 6 is a fragmentary, sectional, side view, of the container and of the bail in position. This view is taken on line 6—6 of Fig. 5, looking in the direction indicated.
Figure 5:
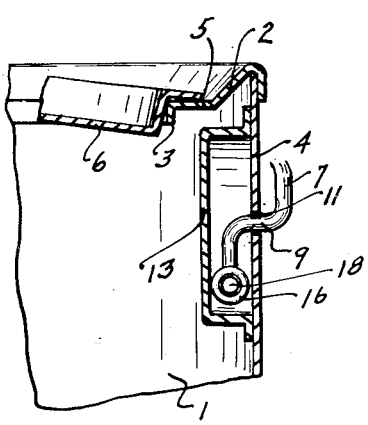
Fig. 5 is a top, plan view of the container and illustrating the bail as being in position to place the cam terminating one end of the bail in position for unseating the lid relative to that of the container.

1 is the body of the container. A flange 2 is disposed at the top of the container and the top is cut out to form a rim 3 that forms the peripheral edge of the top. The rim is spaced apart from the side wall 4 of the container to facilitate the forming of a flat surface 5 upon the rim and adjacent the peripheral edge of the container. A lid 6 is adapted to the container and is adapted for hermetically sealing the container and for being secured thereto by frictional engagement when closed.

A bail 7 is adapted to the container. The bail has journal portions 8 and 9 disposed adjacent the ends of the bail and the same are adapted for passing through holes 10 and 11 disposed within the side walls of the container. Hermetically sealing ears 12 and 13 are adapted to the side walls of the container. The sealing ears may be placed upon the inside, or upon the outside of the container depending upon the class and character of materials that are to be carried within the container. The ear 12 through which the bail passes to the interior of the container is filled with a hermetically sealing compound such as cork 14.

An opening cam 15 terminates one end of the bail and upon the end of the bail upon which the cam is disposed. The bail also passes through the side wall of the ear that is adapted to the side wall of the container and which is to be hermetically sealed relative to the container, through which the journal portion of the bail passes and is adapted for being rotated. The ear 13 may be disposed upon the inner, or outer side of the container and a spring, or other reacting element 16 is disposed within the ear. One end of the reacting element comes to rest against the stop, or seat 17, the other end of the reacting element is adapted for coacting with the end 18 of the bail. The function of the reacting element is to normally maintain the bail in a lowered position and for maintaining the cam out of registry with and inoperative relative to that of the underside of the lid.

The purpose of the cam is to provide manually manipulative means associated with the container and that is always operable relative thereto that may be utilized in unseating the lid from its frictional engagement with that of the container. The ear 13 may be hermetically sealed relative to the side wall of the container and if so sealed relative thereto as by being soldered thereto. The inner portion of the same need not be with a hermetically sealing compound.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described the combination of a container, a lid supporting ring mounted upon the upper edge of the container and extending inwardly therefrom to form an annular shelf, a flanged lid frictionally engaged within the inner periphery of the ring and having its flange resting upon said shelf, a bail member swingably mounted to the side walls of the container and having one of its ends terminating in an arm adapted to engage the underside of said lid and lift one edge of said lid from the shelf upon application of downward pressure upon the bail member, the other end of said bail member resting adjacent to a reactance member to maintain the bail member in an inoperative position relative to the lid of said container.

2. In a device of the class described, the combination of a container, a lid supporting ring mounted upon the upper edge of the container and extending inwardly therefrom to form an annular shelf, a flanged lid frictionally engaged with the inner periphery of the ring and having its flange resting upon said shelf, ears formed on the inner wall of the container, packing material disposed within one of the ears, the wall of the container and the wall of the last mentioned ear being apertured, a bail member swingably mounted to the container and having one of its ends turned inwardly and upwardly through said apertures and through said packing, the innermost part of said end of bail being formed into a camming surface for lifting contact with one edge of the underside of said lid, and adapted to lift the same from the container upon downward pressure applied thereto, the other end of said bail disposed against a reactance member for maintaining the cam end of said bail removed from the lid of said container.

BEAUFORD B. SMITH.